US007612550B2

(12) United States Patent
Usui

(10) Patent No.: US 7,612,550 B2
(45) Date of Patent: Nov. 3, 2009

(54) DROPPER TYPE REGULATOR

(75) Inventor: Hiroshi Usui, Sakado (JP)

(73) Assignee: Sanken Electric Co., Ltd. (JP)

( * ) Notice: Subject to any disclaimer, the term of this patent is extended or adjusted under 35 U.S.C. 154(b) by 176 days.

(21) Appl. No.: 11/940,404

(22) Filed: Nov. 15, 2007

(65) Prior Publication Data

US 2008/0116859 A1 May 22, 2008

(30) Foreign Application Priority Data

Nov. 17, 2006 (JP) ............................ 2006-311469

(51) Int. Cl.
*G05F 1/575* (2006.01)
*H02H 9/02* (2006.01)

(52) U.S. Cl. ........................................ 323/285; 361/18

(58) Field of Classification Search ................. 323/223, 323/282, 284, 285, 289, 351; 361/18, 91.1, 361/91.2, 93.9

See application file for complete search history.

(56) References Cited

U.S. PATENT DOCUMENTS 5,408,173 A * 4/1995 Knapp ........................ 323/285
6,452,369 B1 * 9/2002 Lang .......................... 323/285

FOREIGN PATENT DOCUMENTS

JP 2005-115601 4/2005

* cited by examiner

*Primary Examiner*—Gary L Laxton
(74) *Attorney, Agent, or Firm*—Wood, Herron & Evans, LLP

(57) ABSTRACT

A dropper type regulator of the invention, in which a semiconductor device is connected in series between a DC power supply and a voltage output terminal, extracts a second voltage from the first voltage of the DC power supply; when the driving voltage of the semiconductor device is detected as being larger than a preset first threshold value, the voltage difference occurring between the input and output terminals of the semiconductor device is detected, and when this voltage difference is detected as being larger than a second threshold value, an overload protection circuit performs overload protection.

8 Claims, 4 Drawing Sheets

DROPPER TYPE REGULATOR

BACKGROUND OF THE INVENTION

1. Field of the Invention

The present invention relates to a dropper type regulator, provided with an overload protection function.

Priority is claimed on Japanese Patent Application No. 2006-311469, filed Nov. 17, 2006, the entire contents of which are incorporated herein by reference.

2. Description of the Related Art

A dropper type regulator of the prior art has an overload protection circuit such as that shown for example in FIG. 5.

In FIG. 5, a semiconductor device Q1 and a current detection resistor R5 are connected in series between the positive (+)-side terminal (positive terminal) of a DC power supply 100 and the voltage output terminal Tout, and a smoothing capacitor C2 is connected between the voltage output terminal Tout and the GND (ground) terminal.

The DC power supply 100 has a first voltage (first DC voltage). This first voltage becomes a second voltage (second DC voltage) due to the voltage drop across the semiconductor device Q1, and is output, as a voltage +Vo1, to the voltage output terminal Tout. That is, the dropper type regulator causes a drop in the power supply voltage Ein of the DC power supply 100, and outputs it as the power supply voltage +Vo1.

The semiconductor device Q1 is an N-channel MOS transistor. A bias resistor R1 is connected in parallel between the drain terminal and the gate terminal of the MOS transistor.

A resistor R2 and a shunt regulator Z1 are connected in series between the gate of the semiconductor device Q1 and the ground point GND. The resistor R2 is inserted between the gate of the semiconductor device Q1 and the cathode K of the shunt regulator Z1.

Resistors R3 and R4 are connected in series between the voltage output terminal Tout and the ground point GND. The reference terminal R of the shunt regulator Z1 is connected to the point Q connecting the resistors R3 and R4.

A capacitor C1 is connected between the cathode K of the shunt regulator Z1 and the connection point Q.

The inverting input terminal of a comparator COMP1 is connected to the source terminal of the semiconductor device Q1, and the non-inverting input terminal is connected to the positive electrode of a reference power supply 200 (voltage Vref1). The negative electrode of the reference power supply 200 is connected to the voltage output terminal Tout.

The output terminal of the comparator COMP1 is connected to the input terminal IN of a latch circuit LATCH. The output terminal OUT of the latch circuit LATCH is connected to the gate terminal of the semiconductor device Q1.

Next, referring to FIG. 5, an operation of the overload protection circuit in a conventional dropper type regulator will briefly be explained.

The voltage Ein output by the DC power supply 100 is applied, as a bias voltage, to the gate terminal of the semiconductor device Q1, via the bias resistor R1. By this means, the semiconductor device Q1 turns on state, and current flows in the path through the DC power supply 100, the semiconductor device Q1, the current detection resistor R5, the capacitor C2, and the DC power supply 100, in this order.

Hence, the voltage +Vo1 across the capacitor C2, that is, the output voltage appearing across the voltage output terminal Tout and the GND terminal, reaches a prescribed voltage.

As a result, the voltage across the reference terminal R and the anode A of the shunt regulator Z1 becomes an internal reference voltage (for example, 2.5 V), and the impedance between the cathode K and anode A declines. When the impedance of the shunt regulator Z1 declines, the bias voltage which biases the gate terminal of the semiconductor device Q1 via the resistor R2 declines.

As a result, the impedance of the semiconductor device Q1 rises, and the output voltage +Vo1 declines.

Hence by arbitrarily setting each of the resistors R1, R2, R3 and R4 and the internal reference voltage of the shunt regulator Z1, feedback control can be implemented such that the output voltage is a fixed value. That is, the value of the voltage +Vo1 can be set through the ratio of the resistors R3 and R4. A phase-compensating capacitor C1 is connected between the cathode K and reference terminal R of the shunt regulator Z1, to stabilize the control system.

In the power supply device of the above-described dropper type regulator, the load current flowing to the load from the voltage output terminal Tout is detected by the current detection resistor R5.

Upon detecting that the voltage across the current detection resistor R5 has reached the reference voltage Vref1, the comparator COMP1 outputs L level from the output terminal. This output is input to the input terminal IN of the latch circuit LATCH.

When L level is input, the latch circuit LATCH is set so as to output L level from the output terminal OUT. The latch circuit LATCH may have a delay time, so that there is no operation during rush currents flowing into the capacitor C2 on startup, or during rush currents flowing into capacitors or similar in the load equipment connected between the output terminal Tout and GND terminal.

As explained above, when the load connected to the voltage output terminal Tout increases, the voltage across the current detection resistor R5 rises. When this voltage reaches the reference voltage Vref1, the output of the comparator COMP1 is set to L level, and an overload state is detected. The output terminal OUT of the latch circuit LATCH outputs an L level signal, the voltage applied to the gate terminal of the semiconductor device Q1 is bypassed, and the gate voltage of semiconductor device Q1 is lowered. By this means, when an overcurrent flows in the load, the semiconductor device Q1 is turned off, so that the dropper type regulator provides protection from overloads.

A current-limiting device which controls the IC output current in the dropper type regulator is disclosed in Japanese Unexamined Patent Application, first Publication (JP-A) No. 2005-115601. This current-limiting device has a current-limiting circuit (first current-limiting circuit) which monitors the output current controlled by an output driver transistor external to a voltage regulator IC (constant-voltage source IC) and controls the output current, and a current-limiting circuit (second current-limiting circuit) which monitors the output of an output amplifier within the voltage regulator IC (constant-voltage IC) and performs output current control.

When performing high-precision current limiting, the first current-limiting circuit is selectively operated, and on the other hand when performing low-cost current limiting, the second current-limiting circuit can be selectively operated.

In the conventional current-limiting device, the voltage from the reference voltage circuit is input to an output amplifier and is output to the output terminal via an external output driver transistor. The output at the output terminal is fed back in the output amplifier, compared with the voltage from the reference voltage circuit, and the output driver transistor is controlled to stabilize the output.

The current in an NMOS transistor used in the second current-limiting circuit is controlled based on the output of the output amplifier. The current flowing in the NMOS transistor is detected using a resistor and is limited. The NMOS transistor forms a current mirror together with a transistor which controls the base current of the output driver transistor. Hence a current proportional to the base current of the output driver transistor flows in the NMOS transistor, and so the current of the output driver transistor can be detected. As a result, the output current can be detected without providing an external resistor to detect the current output of the voltage regulator IC.

In recent years, efforts have been made to reduce voltage drops between the input and output in order to suppress to the extent possible losses in dropper circuits. In particular, this has been achieved through the use of MOS-FETs with low on-resistance.

In the example of the conventional art shown in FIG. 5, as already explained, a current detection resistor R5 is inserted for overcurrent protection of the regulator. This current detection resistor R5 must have a resistance sufficient to obtain a certain voltage difference in order to reliably detect the current supplied to the load. That is, in order to perform overload detection, in general the voltage across a current detection resistor R5 is set to approximately 100 mV. Hence, when for example the load current is 10 A, a loss of 1 W occurs in the current detection resistor R5. Hence a resistance sufficiently large to withstand this detected current and voltage must be provided.

As a result, steady-state electrical power losses have been large, and because a resistance having a substantial power rating must be used, costs have been high as well.

Further, when the voltage occurring across the current detection resistor R5 is made low, the comparator employed for load current detection must be more precise. Hence there is the drawback that compared with the cost of the regulator, the overload protection circuit is expensive.

Further, in the device described in JP-A No. 2005-115601, a current mirror circuit which generates a current proportional to the current flowing in the driver transistor must be provided and, moreover, a resistor is necessary to detect the current proportional to the current flowing in the driver transistor, so that there is the disadvantage that the circuit scale is increased.

SUMMARY OF THE INVENTION

The present invention was made in light of the above circumstances, and has as an object to provide a dropper type regulator which reduces the voltage drop in the current detection resistor, and which can efficiently perform overload protection.

The dropper type regulator of a first aspect of the invention has a semiconductor device, provided with input and output terminals connected to a DC power supply and to a voltage output terminal, respectively; a first comparator, which compares a driving voltage applied to a control terminal of the semiconductor device with a first threshold value set in advance, and when the driving voltage is higher than the first threshold value, outputs a first detection signal; a second comparator, which compares the voltage difference occurring between the input and output terminals of the semiconductor device with a second threshold value set in advance, and when the voltage difference is greater than the second threshold value, outputs a second detection signal; and, an overload protection circuit, which performs overload protection when the first comparator outputs the first detection signal and moreover the second comparator outputs the second detection signal.

Further, the dropper type regulator of a second aspect of the invention has a semiconductor device, provided with input and output terminals connected to a DC power supply and to a voltage output terminal respectively; a converter, which detects a driving voltage applied to a control terminal of the semiconductor device, and generates a reference voltage which changes according to the value of the driving voltage; a comparator, which compares the voltage difference occurring between the input and output terminals of the semiconductor device with the reference voltage output by the converter, and when the voltage difference is greater than the reference voltage, outputs a detection signal; and, an overload protection circuit, which performs overload protection when the comparator outputs the detection signal.

By means of this invention, in the overload protection circuit of a dropper circuit, when the driving voltage applied to the semiconductor device and driving current have exceeded a preset first threshold value, the potential difference across the semiconductor device is measured and determined to exceed or not to exceed a second threshold value, and the overload current is measured using this detection result; hence there is no need to provide special current detection means as in the prior art, and efficient overload detection and protection can be performed.

DESCRIPTION OF THE PREFERRED EMBODIMENTS

First Embodiment

Figure 1:
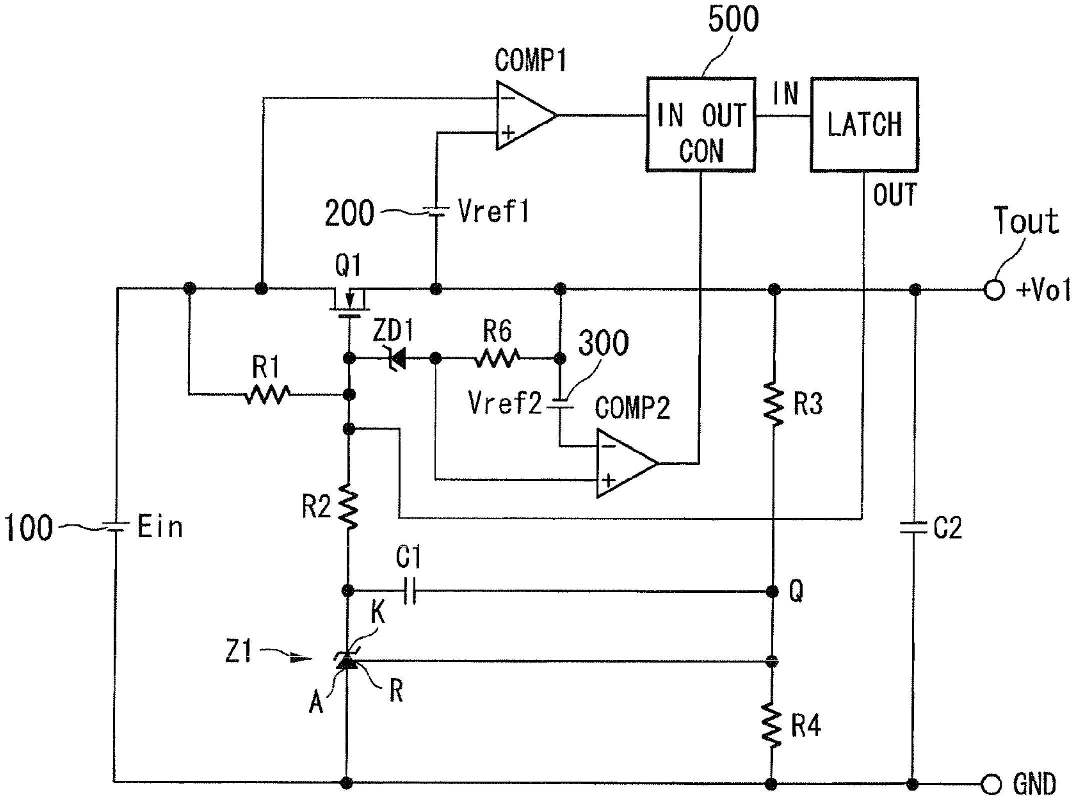
FIG. 1 is a circuit diagram showing the dropper type regulator of a first embodiment of the invention.

Below, the dropper type regulator of a first embodiment of the invention is explained, referring to the drawings. FIG. 1 is a block diagram showing an example of the configuration of the dropper type regulator of this embodiment.

Figure 5:
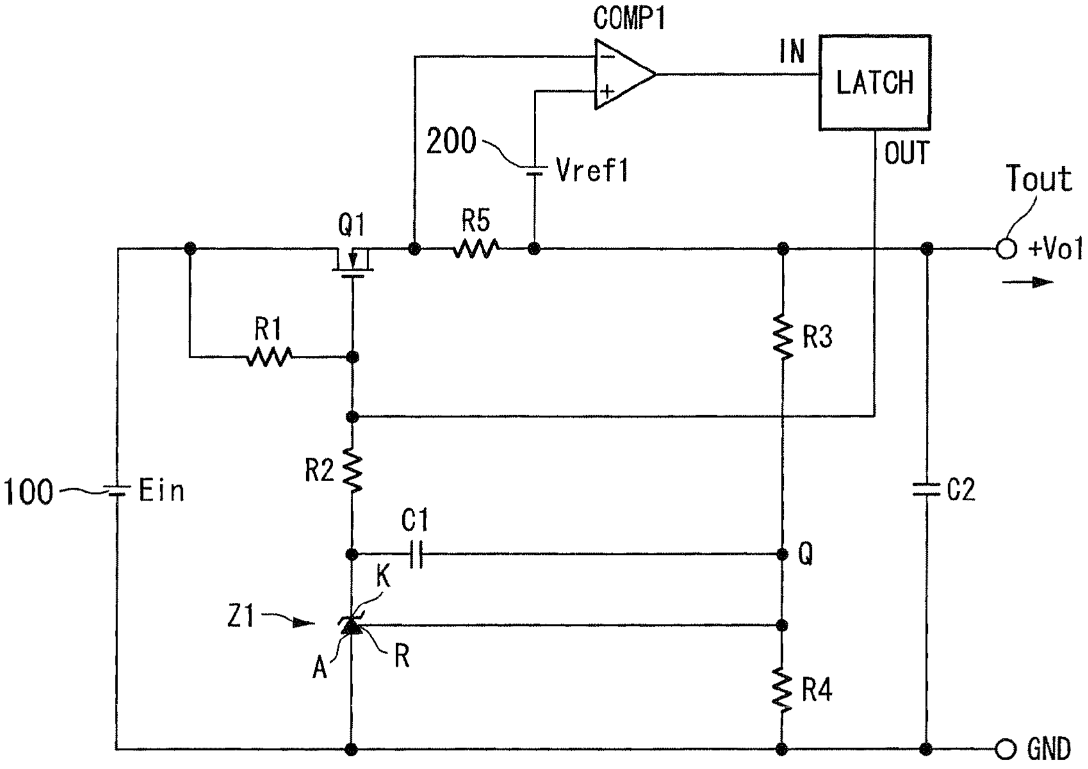

In the figure, portions which are the same as in the conventional device shown in FIG. 5 are assigned by the same symbols.

In FIG. 1, the input and output terminals of the semiconductor device Q1 are respectively connected to the positive (+)-side terminal (positive electrode) of the DC power supply 100 and to the voltage output terminal Tout to which the load is connected. A smoothing capacitor C2 is connected between the voltage output terminal Tout and the GND terminal (connection point).

The DC power supply 100 has a first voltage (first DC voltage). This first voltage becomes a second voltage (second DC voltage) as a result of the voltage drop due to the semiconductor device Q1, and is output, as the voltage +Vo1, across the voltage output terminal Tout and the GND terminal. That is, the dropper type regulator drops the power supply voltage Ein of the DC power supply 100, and outputs the result as the power supply voltage +Vo1.

The semiconductor device Q1 is an N-channel MOS transistor; a bias resistor R1 is connected in parallel between the drain terminal and the gate terminal.

A resistor R2 and a shunt regulator Z1 are connected in series between the gate (control terminal) of the semiconductor device Q1 and the connection point GND. The resistor R2 is inserted between the gate of the semiconductor device Q1 and the cathode K of the shunt regulator Z1.

Resistors R3 and R4 are connected in series between the voltage output terminal Tout and the connection point GND. The reference terminal R of the shunt regulator Z1 is connected to the connection point Q between the resistors R3 and R4.

The capacitor C1 is connected between the cathode K of the shunt regulator Z1 and the connection point Q.

A difference between the dropper type regulator shown in FIG. 1 and the conventional one (FIG. 5) is that the current detection resistor R5 is removed from the protection circuit, and current flowing through the load is measured across the semiconductor device Q1. The semiconductor device Q1 is an N-channel MOS-FET, the drain (input terminal) of which is connected to the positive electrode of the DC power supply 100, the source (output terminal) of which is connected to the voltage output terminal Tout, and the gate (control terminal) of which is connected to the drain via resistor R1.

In the conventional regulator shown in FIG. 5, an overload state is detected through the current detection resistor R5. On the other hand, in the regulator of FIG. 1, the current detection resistor R5 is omitted, and the potential difference due to the voltage drop resulting from the on-resistance across the drain and source of the semiconductor device Q1 is used for detection.

Hence the inverting input terminal of the comparator COMP1 is connected to the drain of the semiconductor device Q1, and the non-inverting input terminal is connected to the source of the semiconductor device Q1 via the reference power supply 200. The positive electrode of the reference power supply 200 is connected to the non-inverting input terminal, and the negative electrode is connected to the source of the semiconductor device Q1.

Further, the output terminal of the comparator COMP1 is connected via the analog switch 500 to the input terminal of the latch circuit LATCH.

The analog switch 500 outputs an H level signal from the output terminal OUT when an L level signal is input to the control terminal CON, regardless of the level of the signal at the input terminal IN, and outputs the level signal, which is the same as that of the signal input to the input terminal IN, from the output terminal OUT when an H level signal is input to the control terminal CON.

In the semiconductor device Q1, a Zener diode ZD1 and a resistor R6 are connected in series between the gate and the source. The cathode of the Zener diode ZD1 is connected to the gate of the semiconductor device Q1.

The inverting input terminal of the comparator COMP2 is connected to the source of the semiconductor device Q1 via the reference power supply 300 (voltage Vref2), and the non-inverting input terminal is connected to the connection point of the Zener diode ZD1 and the resistor R6. The output terminal of the comparator COMP2 is connected to the control terminal CON of the analog switch 500.

Next, FIG. 1 is used to explain operation of the dropper type regulator of the first embodiment of the invention.

The dropper type regulator of FIG. 1 operates as follows when the load current supplied to the load increases and an overload state occurs.

When the load current output from the voltage output terminal Tout increases, the output voltage Vo1 decreases. As a result, because a voltage resulting from voltage division by the resistors R3 and R4 is input to the shunt regulator Z1 from a point Q (the connection point of resistors R3 and R4), the voltage input to the reference terminal R decreases.

Because the voltage at the reference terminal R decreases, the impedance across the cathode K and anode A of the shunt regulator Z1 increases.

As a result, the voltage applied to the gate of the semiconductor device Q1 rises, and the on-resistance falls, so that the voltage difference between the drain and source decreases.

At this time, the impedance of the shunt regulator Z1 increases until the voltage at the reference terminal R is equal to the internal reference voltage. That is, the voltage applied to the gate of the semiconductor device Q1 increases until the voltage at point Q is equal to the internal reference voltage, and the output voltage Vo1 rises.

On the other hand, when the load current decreases, the output voltage Vo1 rises, and the voltage at point Q rises, the voltage input to the reference terminal R of the shunt regulator Z1 rises.

As a result of the rise in the voltage applied to the reference terminal R, the impedance of the shunt regulator Z1 decreases.

As a result, the voltage applied to the gate of the semiconductor device Q1 decreases, and the on-resistance increases, so that the voltage difference between the drain and source increases.

In this way, the impedance of the shunt regulator Z1 decreases until the voltage at the reference terminal R (point Q) decreases and becomes equal to the internal reference voltage.

As explained above, in the dropper type regulator of FIG. 1, when the load current increases and the output voltage Vo1 decreases, the gate voltage of the semiconductor device Q1 rises. On the other hand, when the load current decreases and the output voltage Vo1 rises, operation occurs such that the gate voltage of the semiconductor device Q1 falls, and the output voltage is held at a prescribed voltage.

In this embodiment, rises in the gate voltage of the semiconductor device Q1 due to increases in load current are monitored by the Zener diode ZD1 and comparator COMP2 provided between the gate and source of the semiconductor device Q1.

That is, when the load current increases, the voltage applied to the gate rises, and the Zener voltage of the Zener diode ZD1 is reached, a current flows from the cathode to the anode of the Zener diode ZD1.

The current flowing in the Zener diode ZD1 causes a voltage to appear across resistor R6. When this voltage exceeds the voltage Vref2 of the reference power supply 300, the output of the comparator COMP2 changes from L level to H level.

As a result, H level is input to the control terminal CON of the analog switch 500 to turn the switch to the on state, and the level signal, which is the same as that of the signal input to the input terminal IN, that is, an H level signal, is output from the output terminal OUT. At this time, the latch LATCH inputs an H level signal from the input terminal IN, so that the signal from the output terminal OUT remains at H level and does not change.

When there is a further increase in the load current, the voltage between the drain and source of the semiconductor device Q1 rises further. When the voltage across the drain and source of the semiconductor device Q1 reaches the reference voltage Vref1 of the reference power supply 200, the output of the comparator COMP1 changes from H level to L level.

At this time, the analog switch 500 is in the on state, so that the signal level output from the output terminal OUT changes from H level to L level.

As a result, the output of comparator COMP1 is transmitted to the input terminal IN of the latch circuit LATCH, and the output terminal of the latch circuit LATCH changes from H level to L level.

When the output of the latch circuit LATCH changes to L level, L level is applied to the gate of the semiconductor device Q1. Hence the semiconductor device Q1 enters the off state, and output from the DC power supply 100 to the voltage output terminal Tout is cut off.

In other words, when the voltage applied to the gate of the semiconductor device Q1 exceeds the Zener voltage of the Zener diode ZD1, and moreover the voltage between the drain and source of the semiconductor device Q1 becomes equal to or greater than a preset threshold voltage (Vref1), an overload state is judged to exist, and output from the voltage output terminal Tout is turned off.

A resistor may be used in place of the Zener diode ZD1 in order for the comparator COMP2 to detect the voltage applied to the gate of the semiconductor device Q1.

Through the above-described configuration, in this embodiment there is no need to provide a current detection resistor R5, and unnecessary power losses need not be incurred, as in the conventional art, in order to measure the load current.

In the embodiment of FIG. 1, instead of measuring the voltage across a current detection resistor R5, the load current is detected using the on-resistance between the drain and source of the semiconductor device Q1.

However, because the semiconductor device Q1 is used in a dropper circuit, there is high impedance during light loading. Hence the voltage difference occurring between the drain and source is large, and so there are cases in which the output from comparator COMP1 is L level even during light loading.

Hence in this embodiment, an analog switch 500 is provided such that, so long as the voltage between the gate and source of the semiconductor device Q1 does not exceed the threshold voltage Vref2, the output of comparator COMP1 does not drive the latch circuit LATCH.

The series circuit comprising the Zener diode ZD1 and resistor R6 is conducting when a driving voltage higher than a preset value is applied to the gate of the semiconductor device Q1. Consequently, the Zener voltage of the Zener diode ZD1 is set such that there is conduction when the voltage between the gate and source becomes equal to the preset voltage.

The comparator COMP2 compares the voltage appearing across resistor R6 due to conduction by the Zener diode ZD1 with the threshold voltage Vref2. When the comparator COMP2 detects that the voltage across resistor R6 is greater than the threshold voltage Vref2, H level is output from the output terminal. The analog switch 500 becomes active when H level is input to the control terminal CON from the comparator COMP2. In this way, the latch circuit LATCH is made to operate by the output from the comparator COMP1 only when a voltage higher than the preset voltage is applied to the gate of the semiconductor device Q1.

To summarize the operation of the above-described embodiment, when overloading occurs, the output voltage Vo1 from the voltage output terminal Tout declines. The shunt regulator Z1 cause the voltage applied to the gate of the semiconductor device Q1 to rise in response to the decline in the voltage input to the reference terminal R.

When the voltage applied to the gate of the semiconductor device Q1 exceeds the Zener voltage of the Zener diode ZD1, current flows in the resistor R6. When the comparator COMP2 detects that the voltage applied to the resistor R6 exceeds the threshold voltage Vref2, the analog switch 500 is put into the operable state. Also, when a large current flows in the semiconductor device Q1 and the voltage between the drain and source exceeds the threshold voltage Vref1, the comparator COMP1 sends a detection signal to the analog switch 500. The analog switch 500, in the operating state, causes the latch circuit LATCH to operate by means of this detection signal. The output of the latch circuit LATCH changes to L level, and, as a result, L level is applied to the gate of the semiconductor device Q1. Hence the semiconductor device Q1 is turned off, and output from the DC power supply 100 to the voltage output terminal Tout is cut off. Through the above-described processing, reliable overload protection of the dropper type regulator is possible.

In recent years, the on-resistance of semiconductor devices Q1 such as that used in this embodiment have been lowered, and the voltage drop (voltage difference between drain and source) has also been reduced.

As a result, in order to measure the voltage difference between drain and source, normally a high-precision comparator would be necessary.

However, in this embodiment, by limiting the voltage Vgs between the gate and source of the semiconductor device Q1 to less than the Zener voltage of the Zener diode ZD1, a high-precision comparator is rendered unnecessary.

Figure 2A:
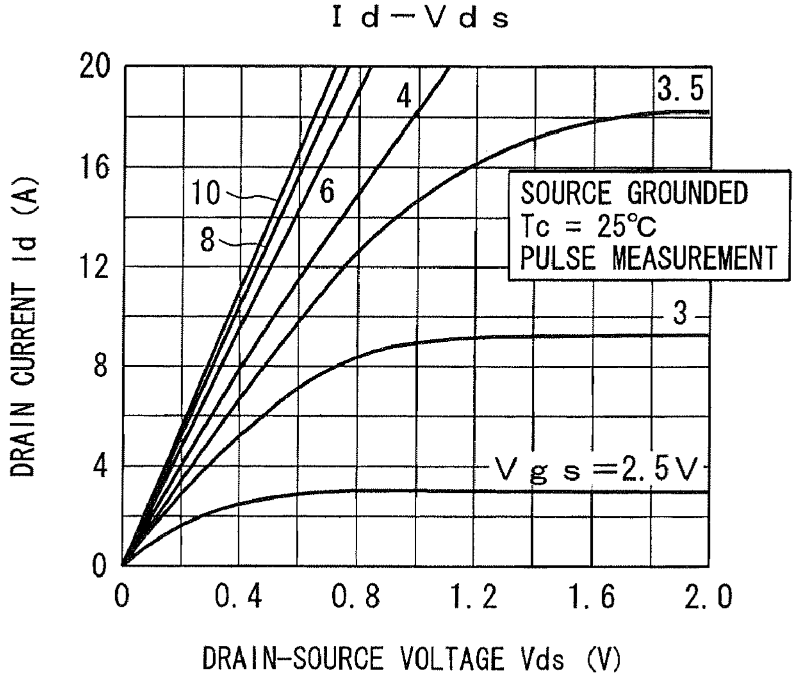
FIG. 2A is a graph showing characteristics of the MOS-FET shown in FIG. 1.
Figure 2B:
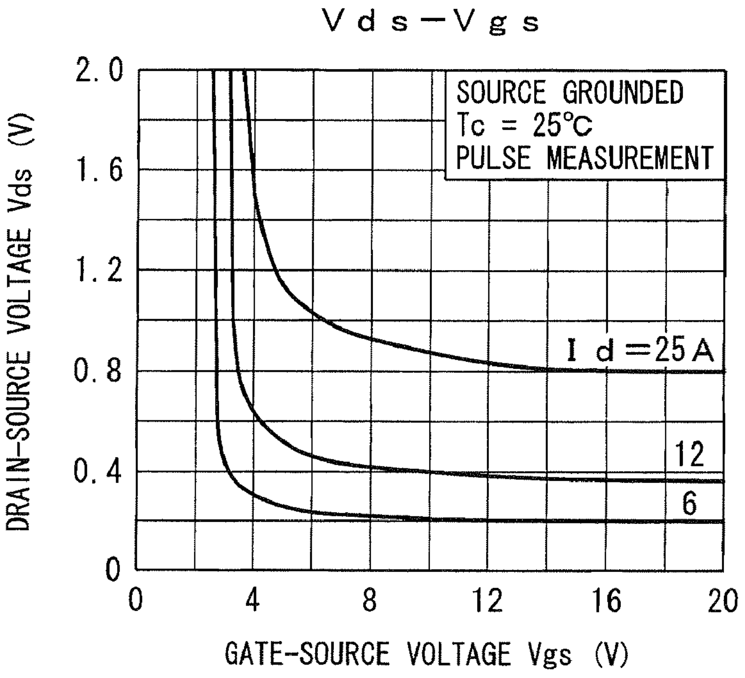
FIG. 2B is a graph showing characteristics of the MOS-FET shown in FIG. 1.

FIG. 2A and FIG. 2B are graphs showing the relation between the drain-source voltage Vds, drain current Id, and gate-source voltage Vgs of the N-channel MOS-FET.

In FIG. 2A, the horizontal axis indicates the voltage Vds (V) between the drain and the source, and the vertical axis indicates the drain current Id (A). In FIG. 2B, the horizontal axis indicates the gate-source voltage Vgs (V), and the vertical axis denotes the grain-source voltage Vds (V).

As is seen from the graphs of FIG. 2A and FIG. 2B, the voltage between gate and source Vgs is limited by the Zener voltage of the Zener diode ZD1, so that when overloading occurs and the drain current Id increases, the drain-source voltage Vds rises sharply.

Hence in this embodiment, an overload state can easily be detected without using a high-precision comparator.

Second Embodiment

Figure 3:
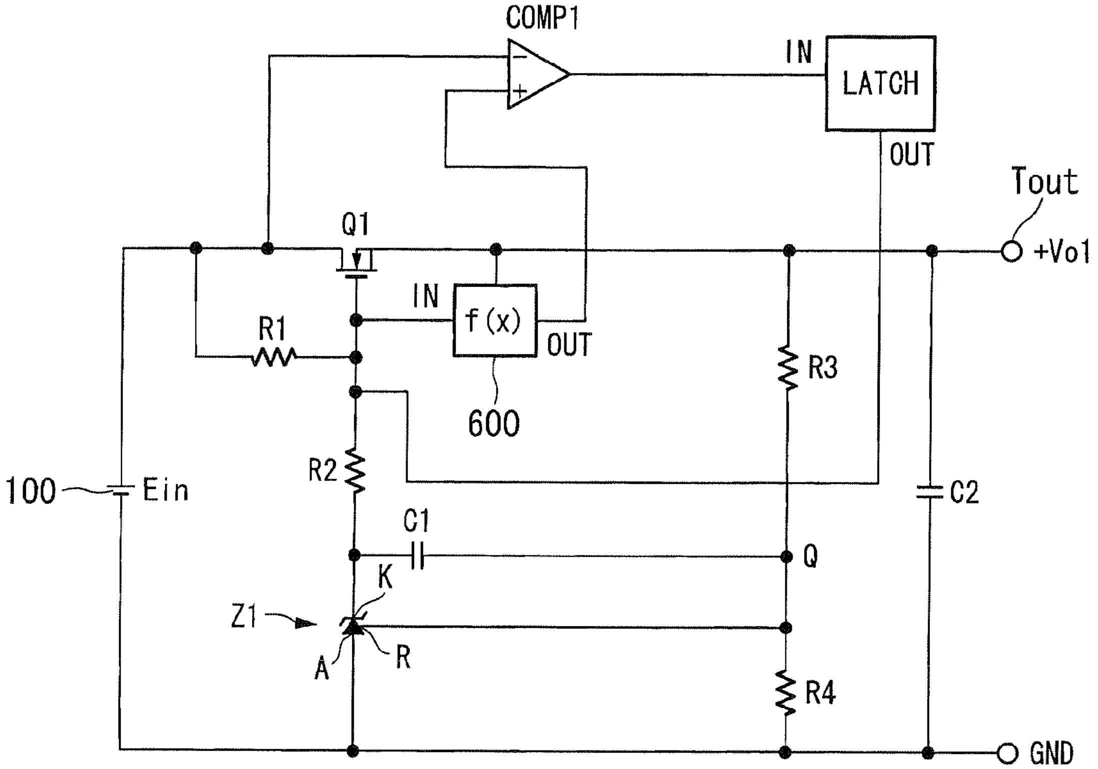
FIG. 3 is a circuit diagram showing the dropper type regulator of a second embodiment of the invention.

A second embodiment of the invention appears in FIG. 3. In this second embodiment, portions of the configuration similar to those of the first embodiment shown in FIG. 1 are assigned by the same symbols, and explanations are omitted. The second embodiment differs from the first embodiment in that, in place of the reference power supply 200, reference power supply 300, Zener diode ZD1, resistor R6, comparator COMP2, and analog switch 500, a converter 600 is provided. Below, differences in the configuration and operation with those of the first embodiment are explained.

In the dropper type regulator of the second embodiment, the converter 600 detects the voltage between the gate and source of the semiconductor device Q1, and supplies a reference voltage VFref, which changes according to the detected voltage, to the non-inverting input terminal of the comparator COMP1.

Figure 4:
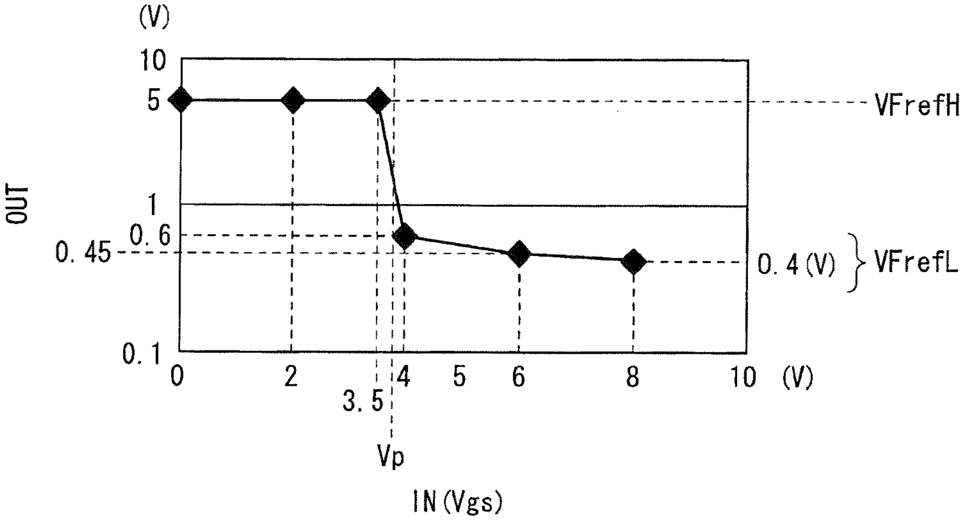
FIG. 4 is a graph showing relationships between the input voltage and output voltage of the converter shown in FIG. 3; and, FIG. 5 is a circuit diagram showing a conventional dropper type regulator.

As shown in the graph of FIG. 4, this generator 600 causes the reference voltage VFref to change according to the input voltage IN (the voltage difference between gate and source). When the input voltage IN does not exceed the threshold value Vp, that is, when the voltage applied to the gate does not indicate an overload state for the dropper type regulator, the converter 600 outputs the reference voltage VFrefH.

However, when the input voltage IN exceeds the threshold voltage Vp, that is, when the voltage applied to the gate indicates an overload state for the dropper type regulator, the converter 600 outputs the reference voltage VFrefL. The reference voltages VFref output by the converter 600 have the relation VFrefH>VFrefL.

That is, when the dropper type regulator is not in an overload state, and the load current is small, the driving voltage applied to the gate of the semiconductor device Q1 does not exceed the threshold voltage Vp, and so the generator 600 outputs a high reference voltage VFrefH to the comparator COMP1. On the other hand, when in an overload state, with a large load current, the driving voltage exceeds the threshold voltage Vp, and so the generator 600 outputs a low reference voltage VFrefL to the comparator COMP1.

The comparator COMP1 compares the voltage difference Vds between the drain and source of the semiconductor device Q1 with the reference voltage VFref output from the generator 600, and upon detecting that the voltage Vds is higher than the reference voltage VFref, outputs L level from the output terminal to the latch circuit LATCH.

When an L level signal is input as a trigger, the latch circuit LATCH outputs an L level signal to the gate of the semiconductor device Q1. By this means, the voltage applied to the gate of the semiconductor device Q1 is lowered, and the semiconductor device Q1 enters the off state.

In the generator 600, the reference voltages VFref are set according to the driving voltage applied to the gate of the semiconductor device Q1. Hence the amount of increase in the voltage across the drain and source which causes the semiconductor device Q1 to be turned off can be changed (adjusted) according to the load state of the dropper type regulator.

That is, when the dropper type regulator is in an overload state, the reference voltage VFref is set to a low voltage VFrefL, so that the comparator COMP1 detects comparatively small increases in the drain-source voltage Vds of the semiconductor device Q1. As a result of this detection, the output of the latch circuit LATCH is set to L level, and the semiconductor device Q1 is put into the off state.

On the other hand, when the dropper type regulator is not in an overload state, the reference voltage VFref is set to the high voltage VFrefH, so that the comparator COMP1 detects only comparatively large increases in the drain-source voltage Vds of the semiconductor device Q1. That is, if the voltage increase in the drain-source voltage of the semiconductor device Q1 does not exceed the voltage VFrefH, the comparator COMP1 does not output an L level signal to the latch circuit LATCH, and the semiconductor device Q1 remains in the on state.

Thus the reference voltage VFref is changed according to the load state of the dropper type regulator, so that similarly to the first embodiment, the driving voltage across the gate and source is detected by the comparator, and there is no need to control an analog switch 500.

The value of the reference voltage VFrefH is set to be higher than the voltage drop of the dropper type regulator, so that during light loading when the load current is small, the overload protection circuit does not operate.

By using an arbitrary function such as that shown in FIG. 4 as the conversion relation between the input voltage and output voltage in the converter 600, the voltage Vds between the drain and source for the semiconductor device Q1 in the off state can be set arbitrarily for a driving voltage (gate-source voltage Vgs for the semiconductor device Q1) applied to the gate of the semiconductor device Q1.

By setting the above function in conjunction with the characteristic of the voltage Vgs and voltage Vds for the semiconductor device Q1 shown in FIG. 2, overload state detection can be performed accurately.

Further, the overvoltage protection of the input voltage Ein, as well as cutoff of the semiconductor device when the power consumed in the semiconductor device Q1 exceeds a prescribed value, are also possible.

The first and second embodiments have been explained; however, in the first embodiment, the following modifications are possible. As the analog switch 500 shown in FIG. 1, an OR circuit can also be used. In this case, the signals input to the inverting input terminal and to the non-inverting input terminal of the comparator COMP2 are reversed; that is, the positive electrode of the reference power supply 300 is connected to the non-inverting input terminal, and the inverting input terminal is connected to the connection point of the Zener diode ZD1 and the resistor R6. Further, the output terminal of comparator COMP1 is connected to one of the terminals of the two-input OR circuit, and the other terminal is connected to the output terminal of the comparator COMP2. The output terminal of this OR circuit is connected to the input terminal of the latch circuit LATCH.

By this means, when L level signals are output from the output terminals of both comparators COMP1 and COMP2, the output of the latch circuit LATCH is set to L level, and the semiconductor device Q1 is put into the off state.

Further, in the dropper type regulator of FIG. 1, the voltage Vgs between the gate and source of the semiconductor device Q1 is limited by the Zener voltage of the Zener diode ZD1; but other voltage-limiting means can be used.

Further, a configuration is possible in which, by providing a resistor R6 between the gate and source without providing a Zener diode ZD1, and by measuring the voltage across this resistor R6, when the gate-source voltage Vgs has exceeded a preset voltage value, the comparator COMP2 outputs H level.

Also, in the first embodiment of the invention shown in FIG. 1, the comparator COMP1 may detect large detection voltage changes in the overload state. Hence a configuration is possible in which in place of the comparator COMP1 shown in FIG. 1, the base and emitter of an even more inexpensive bipolar transistor may be connected, and by turning the transistor on and off, the voltage Vds is detected.

In this embodiment, the gate voltage of the semiconductor device Q1 is limited, and so a large voltage can be induced between the drain and source of the semiconductor device Q1 by the load current which increases during overloading. For this reason, although the base-emitter threshold voltage of a bipolar transistor is 0.6 to 0.7 V, the drain-source voltage of the semiconductor device Q1 can be used during overloading.

Further, there is the advantage, because the voltages occurring in the steady state other than an overload state are extremely small (the impedance in the on state is low), a low-loss overload protection circuit can be configured.

In the first and second embodiments of this invention, an N-channel MOS-FET was used as the semiconductor device Q1, and so examples were described in which the bias voltage applied to the gate was limited.

On the other hand, an NPN type bipolar transistor can also be used as the semiconductor device Q1; in this case, by limiting the base current supplied to the base of the bipolar transistor by means of a circuit similar to that of the MOS-FET case, similar advantageous results can be obtained.

What is claimed is:

1. A dropper type regulator comprising:

a semiconductor device provided with input and output terminals connected to a DC power supply and to a voltage output terminal, respectively;

a first comparator which compares a driving voltage supplied to a control terminal of said semiconductor device with a first predetermined threshold value so as to output a first detection signal when said driving voltage is higher than said first threshold value;

a second comparator which compares the voltage difference occurring between the input and output terminals of said semiconductor device with a second predetermined threshold value so as to output a second detection signal when said voltage difference is greater than said second threshold value; and, an overload protection circuit which performs overload protection when said first comparator outputs said first detection signal and said second comparator outputs said second detection signal.

2. The dropper type regulator according to claim 1, wherein said driving voltage is limited to supply to said first comparator until said driving voltage reaches a prescribed value.

3. The dropper type regulator according to claim 1, wherein said semiconductor device is an N-channel MOS transistor, said input and output terminals are the drain terminal and source terminal, respectively, of said N-channel MOS transistor, and said control terminal is the gate terminal of said N-channel MOS transistor.

4. The dropper type regulator according to claim 1, wherein said overload protection circuit supplies a signal to said control terminal to cause said semiconductor device to be in an off state when said first comparator outputs said first detection signal and said second comparator outputs said second detection signal.

5. A dropper type regulator comprising;

a semiconductor device provided with input and output terminals connected to a DC power supply and to a voltage output terminal, respectively;

a converter which detects a driving voltage supplied to a control terminal of said semiconductor device, and generates a reference voltage which changes according to the value of said driving voltage;

a comparator which compares the voltage difference occurring between the input and output terminals of said semiconductor device with said reference voltage output by said converter so as to output a detection signal when said voltage difference is greater than said reference voltage; and, an overload protection circuit which performs overload protection when said comparator outputs said detection signal.

6. The dropper type regulator according to claim 5, wherein said reference voltage changes in accordance with an arbitrary function talking said driving voltage as a variable.

7. The dropper type regulator according to claim 5, wherein said semiconductor device is an N-channel MOS transistor, said input and output terminals are the drain terminal and source terminal respectively of said N-channel MOS transistor, and said control terminal is the gate terminal of said N-channel MOS transistor.

8. The dropper type regulator according to claim 5, wherein said overload protection circuit supplies a signal to said control terminal to cause said semiconductor device to be in an off state when said comparator outputs said detection signal.

* * * * *